(12) United States Patent
Yamamoto

(10) Patent No.: US 6,409,945 B1
(45) Date of Patent: Jun. 25, 2002

(54) METHOD OF CONTROLLING AN APPARATUS FOR TAKING OUT AN INJECTION-MOLDED PRODUCT AND THE APPARATUS FOR CARRYING OUT THE METHOD

(75) Inventor: Koji Yamamoto, Kyoto (JP)

(73) Assignee: Kabushiki Kaisha Yushin Seiki, Kyoto (JP)

( * ) Notice: Subject to any disclaimer, the term of this patent is extended or adjusted under 35 U.S.C. 154(b) by 0 days.

(21) Appl. No.: 09/456,309

(22) Filed: Dec. 8, 1999

(30) Foreign Application Priority Data

Dec. 8, 1998 (JP) ............................. 10-348314

(51) Int. Cl.⁷ .............................................. B29C 45/80
(52) U.S. Cl. .................. 264/40.1; 264/328.1; 264/334; 425/139; 425/165; 425/556; 425/444
(58) Field of Search ............................... 264/40.1, 40.5, 264/328.1, 334; 425/139, 165, 556, 436 R, 444, 436 RM

(56) References Cited

U.S. PATENT DOCUMENTS

| | | | | |
|---|---|---|---|---|
| 3,669,592 A | * | 6/1972 | Miller | |
| 4,204,824 A | * | 5/1980 | Paradis | 425/139 |
| 4,212,622 A | * | 7/1980 | Kikuchi et al. | 425/444 |
| 4,368,018 A | * | 1/1983 | Rees et al. | 425/139 |
| 4,449,914 A | * | 5/1984 | Schmidts et al. | 425/556 |
| 4,514,166 A | * | 4/1985 | Ichizawa et al. | 264/334 |
| 4,732,554 A | * | 3/1988 | Hellmann | 425/139 |
| 4,915,611 A | * | 4/1990 | Brown | 425/556 |
| 5,000,654 A | * | 3/1991 | Shiotani | 425/556 |
| 5,250,239 A | * | 10/1993 | Herbst | 264/334 |
| 5,256,364 A | * | 10/1993 | Herbst | 264/334 |
| 5,354,194 A | * | 10/1994 | Kresak | 425/444 |
| 5,513,970 A | * | 5/1996 | Kimura et al. | 425/139 |
| 5,518,387 A | * | 5/1996 | Di Simone | 425/139 |
| 5,629,031 A | * | 5/1997 | Ishikawa et al. | 425/139 |

FOREIGN PATENT DOCUMENTS

| | | |
|---|---|---|
| DE | 19645463 | 6/1997 |
| JP | 62-170312 | 7/1987 |
| JP | 64-20112 | 1/1989 |

* cited by examiner

*Primary Examiner*—Jill L. Heitbrink
(74) *Attorney, Agent, or Firm*—Fitch, Even, Tabin & Flannery

(57) ABSTRACT

In a method of controlling an apparatus for taking out an injection-molded product, and the apparatus for carrying out the method, a product holder is moved along a locus starting from a waiting position via an initial linear zone, a curve zone and a final linear zone to a holding position for holding the product. A complementary time required for the movement of the product holder by a distance equal to a difference between a length from the waiting position to the holding position in the clamping direction and the length of the final linear zone is determined. The complementary time is subtracted from a ingress time required for the movement of the product holder from the waiting position to a point on a straight line between the male and female molds. A linear distance that the product holder moves from the waiting position A1 toward the point on the linear line for the same period of time as obtained by the subtraction is adopted as the length of the final linear zone.

4 Claims, 5 Drawing Sheets

PRIOR ART

METHOD OF CONTROLLING AN APPARATUS FOR TAKING OUT AN INJECTION-MOLDED PRODUCT AND THE APPARATUS FOR CARRYING OUT THE METHOD

BACKGROUND OF THE INVENTION

1. Field of the Invention

The present invention relates to a method of controlling an apparatus for taking out an injection-molded product from an injection mold and the apparatus for carrying out the method.

2. Disclosure of the Prior Art

FIG. 5 is a schematic diagram showing the areas surrounding an injection molding mechanism and an apparatus for taking out a molded product in an injection molding machine.

A female mold 26 of an injection mold 24 is mounted on a fixed platen 23 disposed at the forward end of an injection machine 1, and a male mold 25 is mounted on a movable platen 22 to be driven by a mold-clamping cylinder 21.

An apparatus 3 for taking out an injection-molded product according to the present invention is provided at a position upward of the mold 24.

The apparatus 3 comprises an movable arm 49 having a product holder 42 for holding a molded product 10 by absorption; a servomotor 91 for moving the movable arm 49 in a mold-clamping direction (hereinafter referred to as "clamping direction servomotor 91"); and a servomotor 92 for ingress of the product holder 42 between the male mold 25 and the female mold 26 in an open state (hereinafter referred to as "ingress direction servomotor 92").

According to the above-mentioned embodiment, the product holder 42 is moved along a locus C shown by an imaginary line in FIG. 5 to take out the molded product 10.

More specifically stated, the product holder 42 laid at a waiting position A1 indicated by a solid line in FIG. 5 is moved in a direction at a right angle to the mold-clamping direction (hereinafter referred to as "clamping direction") by operating the ingress direction servomotor 92. Then the product holder 42 is moved in the clamping direction by operating the clamping direction servomotor 91 before the ingress direction servomotor 92 is stopped. When the clamping direction servomotor 91 commences the operation, the product holder 42 is moved along a curve R and arrives at a holding position A4 at which the product 10 is held (held by the male mold 25). Thereafter a vacuum device (not shown) is operated to hold the product 10 by means of absorption with the product holder 42. Then the product holder 42 is returned along the locus C and the product 10 is released at a specified releasing position to complete the withdrawal of the product 10.

According to this embodiment, when the product holder 42 approaches the product 10 held by the male mold 25, the product holder 42 is moved along the curve R by operating the clamping direction servomotor 91 during the operation of the ingress direction servomotor 92. As a result, the product holder 42 reaches the holding position A4 in the vicinity of the male mold 25 in a shorter time than when the clamping direction servomotor 91 is operated after complete stoppage of the ingress direction servomotor 92 (when the product holder 42 is moved along a L-shaped locus instead of the locus C), whereby the product 10 can be quickly taken out. However, the foregoing conventional embodiment poses problems that a skill is required in adjusting the length of a final linear zone L of the locus C in replacement of the injection mold and that the adjustment of the length is time-consuming.

The foregoing problems will be described in detail.

To obviate or alleviate an error in absorptively holding the product 10 by the product holder 42, the product holder 42 should be moved straight in the clamping direction in the final linear zone L of the locus C.

When the final linear zone L does not exist, especially in the following case, a disadvantage is entailed. Immediately before the product holder 42 at the waiting position A1 arrives at a linear line between the male and female molds 25, 26, the product holder 42 may come into contact with the product 10 on reaching the foremost position in the clamping direction, so that the product holder 42 in contact with the product 10 is moved to the holding position A4, and a force in a moving direction may be exerted on the product holder 42 and then on the product 10, whereby the product 10 may be rendered unstable.

In conventional embodiments of the apparatus 3 for taking out an injection-molded product, the operator actuates an operating device 13 in order to input the length of an initial linear zone S for the linear movement of the product holder 42 from a waiting position A1 to a starting position of curved movement. Thus, the operator actually conducts injection molding operation to visually inspect whether the final linear zone L of the required length is correctly set. If the final linear zone L is found to have an improper length, the operator must re-set the length thereof in the operating device 13. Namely a skill is required in adjusting the length of the final linear zone L.

The foregoing problems are posed by the embodiments of the type wherein the product 10 is absorptively held by the product holder 42. However, the same problems would be encountered by embodiments having a product holder 42 wherein the product 10 is taken out as held between two pinching elements.

SUMMARY OF THE INVENTION

An object of the present invention is to provide a method of controlling an apparatus for taking out an injection-molded product, and the apparatus for carrying out the method, the apparatus being capable of taking out a injection-molded product 10 from a mold in an open state while held by a product holder 42 and releasing it at a releasing position, the apparatus comprising: clamping direction driving means for moving a product holder 42 in a clamping direction; and ingress direction driving means for moving the product holder 42 in a direction at a right angle to the clamping direction such that the clamping direction driving means is operated during the operation of the ingress direction driving means and after stoppage thereof, whereby the product holder 42 is moved along a locus C starting from a waiting position A1 via an initial linear zone S, a curve zone R and a final linear zone L to a holding position A4 for holding the product 10, wherein the length of the final linear zone L can be easily changed when the mold is replaced.

To achieve the foregoing object, the present invention provides a method of controlling an apparatus for taking out an injection-molded product, the method comprising the steps of: determining a time required for the movement of the product holder 42 toward a clamping direction from a starting position of movement in the clamping direction by a distance equal to a difference between a length from the waiting position A1 to the holding position A4 in the clamping direction and the length of the final linear zone L; subtracting the above-mentioned time (hereinafter referred to as "complementary time") from a time required for the movement of the product holder 42 from the waiting position A1 to a point on a straight line between the male and female molds in an open state (hereinafter referred to as "ingress time"); and adopting, as the length of the final linear zone S, a linear distance along which the product holder 42 moves from the waiting position A1 toward the point on the linear line for the same period of time as obtained by the subtraction.

The effects of the technical means mentioned above will be described with reference to FIG. 4.

The complementary time is a time required for the product 42 to move from the starting position of movement in the clamping direction along a distance equivalent to a difference (X−L1) between a distance X in the clamping direction from the waiting position A1 to the holding position A4 on one hand and a distance L1 of the final linear zone L on the other hand. Therefore, when the product holder 42 is moved earlier by the complementary time t2 than the product holder 42 reaches the point on the linear line between the male and female molds in an open state, the product holder 42 is advanced by the distance (X−L1) in the clamping direction when it arrives at a point on a linear line between the male and female molds. Consequently, the product holder 42 can be moved in a linear direction by a distance L1 set by the operator as the final linear zone L.

An ingress time t1 required for the product holder 42 to move from the waiting position A1 to a point on a linear line between the male and female molds in an open state is determined and the complementary time t2 is subtracted from the ingress time t1. The obtained time is equal to a time for the product holder 42 to move from the waiting position A1 to a starting position A2 of curved movement and corresponds to the starting time ts of curved movement as shown in FIG. 4. When a linear distance S1 is determined along which the product holder 42 moves from the waiting position A1 toward a point on the linear line for the same period of time (until a starting time ts of curved movement comes), the linear distance S1 is the length of the initial linear zone S which is required for assuring that the product holder 42 moves straight by a distance L1 as the final linear zone L.

Consequently, when the molded product 10 is taken out by the apparatus with the linear distance S1 set as the distance of initial linear zone S, the product holder 42 straight moves by the length L1 set as the final linear zone L to reach the holding position A4.

A wide variety of embodiments for the product holders 42 include those capable of holding the product by absorption with a vacuum device, and those in which the product is held between a pair of pinching elements.

The present invention can achieve the following results. As described above, according to the technical means of the present invention, the molded product 10 can be taken out based on the length L1 of the final linear zone L. Consequently, the operator can easily adjust the length of the final linear zone L in replacement of an injection mold compared with conventional embodiments wherein the length of the final linear zone L is visually adjusted while repeatedly setting the length S1 of the initial linear zone S on the operating device 13.

To achieve the foregoing object or similar objects, the present invention further provides a method of controlling an apparatus for taking out an injection-molded product, the method comprising the steps of: determining a length (complementary length) by subtracting the length of a specified final linear zone L from the length in a clamping direction between a waiting position A1 and a holding position A4; determining an ingress time for a product holder 42 to move from a waiting position A1 to a point on a linear line between the male and female molds in an open state; determining a complementary time for the product holder 42 to move in a clamping direction by the complementary length from a starting point of movement in the clamping direction; determining a time for the product holder 42 to commence a curved movement by subtracting the complementary time t2 from the ingress time t1; and measuring a linear length for the product holder 42 to move from the waiting position A1 toward a point on a linear line until the above-determined starting time of curved movement, wherein when the product 10 is taken out, the product holder 42 is moved from the waiting position A1 by the above-mentioned linear distance and then the product holder 42 is moved in the clamping direction.

This embodiment is not limited in respect of the order of the steps of determining the complementary length, the ingress time and the complementary time.

The effects of the technical means mentioned above will be described with reference to FIG. 4.

The operator sets the length L1 of the final linear zone L and puts a control action into operation. Then, there is carried out the step of determining the complementary length (X−L1), namely the length in the clamping direction over the entire zone of curved movement of the product holder 42, the complementary length (X−L1) being obtained by subtracting the specified length L1 from the length X in the clamping direction between the waiting position A1 of the product holder 42 and the holding position A4 for holding the product.

Subsequently there is conducted the step of determining the complementary time t2 for the product holder 42 to move in the clamping direction by the complementary length (X−L1). When the product holder 42 is moved in the clamping direction earlier by the complementary time t2 than the product holder 42 reaches a point between the male and female molds in an open state as described hereinbefore, the product holder 42 is moved straight by the length L1 of the final linear zone.

Thus, the step of determining the ingress time t1 is performed, followed by the step of determining the step of subtracting the complementary time t2 from the ingress time t1, whereby there is determined the time required for the product holder 42 to move from the starting position A1 until the product holder 42 reaches a starting position of curved movement, i.e. the time of commencing the curved movement ts. Thereafter there is measured a linear distance S1 along which the product holder 42 moves from the waiting position A1 toward a point on a linear line between the male and female molds in an open state. The linear distance S1 is the length of the initial linear zone S which is required for assuring the linear movement of product holder 42 along the specified length L1, as described above in respect of the position A1.

In taking out the molded product 10, the product holder 42 is moved in the clamping direction when the product holder 42 has moved from the waiting position A1 by the linear distance S1. Likewise, in withdrawal of the product 10, the product holder 42 is linearly moved by the length L1 determined by the means for determining the length of the final linear zone L to reach the holding position A4.

To achieve the foregoing object, the present invention provides an apparatus for taking out an injection-molded product, which apparatus comprises: means for determining the length of a final linear zone in order to set the length of a final linear zone L; means for calculating a length (complementary length) by subtracting the above-specified length of the final linear zone L from the length in a clamping direction between a waiting position A1 and a holding position A4; means for determining a starting time of curved movement by subtracting the complementary time from an ingress time required for an ingress direction servomotor to rotate at a predetermined speed until the product holder 42 starting from the waiting position A1 reaches a point on a linear line between a male mold and a female mold in an open state, the complementary time being one required for a clamping direction servomotor to rotate at a predetermined speed until the product holder 42 moves in a clamping direction by the complementary length from a starting point of movement in the clamping direction; and means for determining an initial rotation amount of the ingress direction servomotor as measured from the initial stage of operation until the determined starting time of curved movement, wherein in taking out the product 10, the ingress direction servomotor is rotated in the rotation amount determined by the means for determining the initial rotation amount of the servomotor, and then the clamping direction servomotor is actuated.

The effects of the technical means mentioned above will be described with reference to FIG. 4.

First, the operator sets a length L1 of the final linear zone L by the means for determining the length of the final linear zone. Then the apparatus is put into operation to obtain a complementary length (X−L1) by subtracting the length L1 of the final linear zone L from the length X in the clamping direction between the waiting position A1 of the product holder 42 and the holding position A4 of the product 10.

On the other hand the time for the product holder 42 to reach a curved zone R, i.e. a starting time S1 of curved movement, is determined by the means for determining the starting time of curved movement. The starting time S1 of curved movement is obtained by subtracting the complementary time t2 from the ingress time t1 required for rotating the ingress direction servomotor to move the product holder 42 from the waiting position A1 to a point on a linear line between the male and female molds, the complementary time t2 being a time required for rotating the clamping direction servomotor until the product holder 42 moves by the complementary length (X−L1).

Next, the ingress direction servomotor is rotated at the specified speed. And the rotation amount of the ingress direction servomotor, which is involved until a starting time S1 of curved movement determined by means for determining the starting time of curved movement, is determined by the means for determining an initial rotation amount of the ingress direction servomotor. This rotation amount is equal to the total rotation amount of the ingress direction servomotor which amount is required for the linear movement of the product holder 42 until a starting time of curved movement. Consequently on rotation of the ingress direction servomotor in said rotation amount, the clamping direction servomotor is actuated so that the product holder 42 commences a curved movement at a suitable time. When the product holder 42 commences the curved movement at this point, and is moved in the clamping direction by the complementary length (X−L1), the ingress direction servomotor is stopped and thereafter only the clamping direction servomotor is rotated to move the product holder 42 linearly along the above-specified length L1.

In taking out the product 10, the ingress direction servomotor is rotated in the rotation amount obtained by the means for determining the initial rotation amount, and then the clamping direction servomotor is put into operation to start the curved movement of the product holder 42. Subsequently the product holder 42 is moved by the length L1 determined, as stated above, by the means for determining the length L1 of the final linear zone L toward the side of the product 10 until it reaches the holding position A4 of the product 10.

The present invention can achieve the following specific results.

As described above, according to the technical means mentioned above, the operator can directly set the length L1 of the final linear zone L by the means for determining the length L1 of the final linear zone L, and thus there is provided an apparatus for taking out an injection-molded product for achieving the foregoing method of controlling the apparatus.

To achieve the foregoing object, the present invention additionally provides an apparatus for taking out an injection-molded product, the apparatus comprising a timer of ingress time for measuring a time for an ingress direction servomotor to rotate at a specific speed until the product holder 42 moves by an ingress length between a waiting position A1 and a point on a straight line between the male and female molds in an open state, a timer of complementary time for measuring a time for a clamping direction servomotor to rotate at a specific speed until the product holder 42 moves along the complementary length, and means for determining a starting time of curved movement by subtracting the complementary time measured by the timer of complementary time from the operation time of the ingress direction servomotor as measured by the timer of ingress time.

According to the above-mentioned embodiment, the timer of ingress time is adapted to measure a time for the operation of the ingress direction servomotor until the rest of operation, whereby a time t1 required for ingression is determined. The timer of complementary time is adapted to measure a time (complementary time) required for rotation of the clamping direction servomotor until the completion of movement of the product holder 42 by the complementary length (X−L1). A starting time of curved movement ts can be obtained by subtracting the complementary time t2 as measured by the timer of complementary time from the operation time (the ingress time t1 required for ingression) of the ingress direction servomotor as measured by the timer of ingress time.

DETAILED DESCRIPTION OF THE EMBODIMENT

The present invention will be described in detail with reference to the following embodiments.

Figure 1:
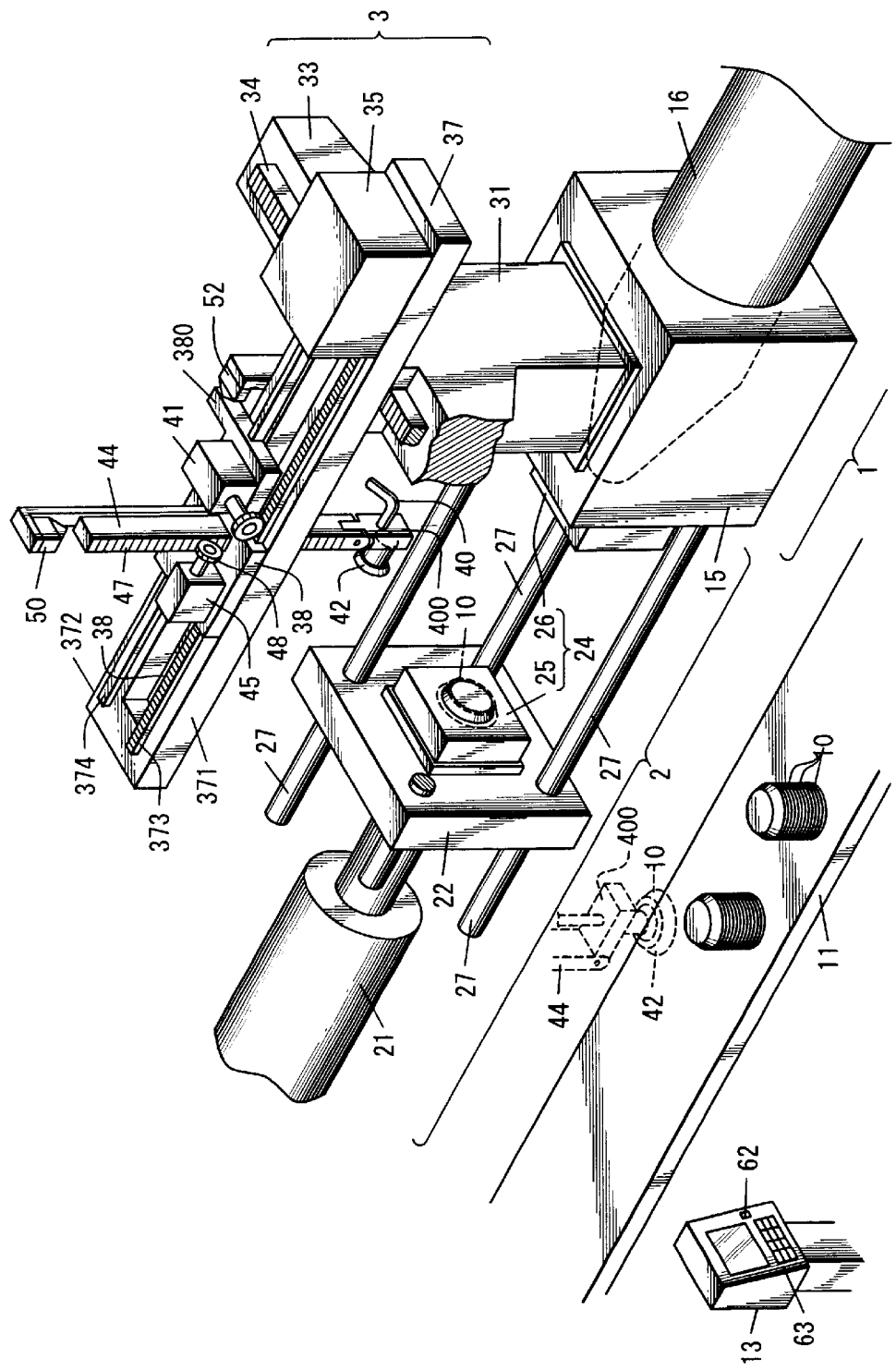
FIG. 1 is a fragmentary view schematically showing, in oblique section, an injection molding machine having an apparatus 3 for taking out an injection-molded product according to one embodiment of the present invention.

FIG. 1 is a perspective view schematically showing an injection molding machine having an apparatus for taking out an injection-molded product according to one embodiment of the present invention.

A mold-clamping machine 2 is arranged in front of an injection device 15 of an injection machine 1. An apparatus 3 for taking out an injection-molded product as provided by the present invention is mounted over the injection device 15. A stage 11 for placing injection-molded products thereon and an operating device 13 are disposed alongside the mold-clamping machine 2.

With respect to the apparatus 3 for taking out an injection-molded product

The apparatus 3 for taking out an injection-molded product has a support 31 standing erect on an upper surface of the injection device 15 of the injection machine 1. A horizontal arm member 33 extends from an upper end of the support 31. A rack-type rail 34 is provided on the top of the horizontal arm member 33. A horizontal arm 37 is movable along the rail 34. Stated more specifically, the horizontal arm 37 moves along the rail 34 by dint of engagement of the rail 34 with a driving gear (not shown) housed in a box casing 35 mounted on one end of the horizontal arm 37.

The horizontal arm 37 is in the shape of a rectangular frame extending lengthwise in the clamping direction as described later. A rack-type rail 373 and a guide rail 374 extends in a longitudinal direction on an upper surface of a pair of long sides 371, 372, respectively constituting the horizontal arm 37. A travelling plate 38 is adapted to travel over the rack-type rail 373 and the guide rail 374. For this purpose, there is mounted on the travelling plate 38 a clamping direction servomotor 41 serving as clamping direction driving means for the movement of the plate 38 in the clamping direction of a mold-clamping machine 2. A vertically moving shaft 44 is moved upward and downward. through the travelling plate 38 by an ingress direction servomotor 45 serving as ingress direction driving means. For this movement, a gear 48 fixed to the ingress direction servomotor 45 is in mesh with concave-convex teeth 47 formed on one side of the vertically moving shaft 44.

Near a lower end of the vertically moving shaft 44 is provided a pivotable arm 400 which is upwardly and downwardly pivotable. A product holder 42 is mounted on the pivotable arm 400 to hold the product 10 by a sucking force applied through an absorption tube 40.

A first limit switch 50 is mounted above the shaft 44 to set the highest elevated position of the shaft 44. The first limit switch 50 is adapted to give an ON signal when the shaft 44 is brought from downward into contact with the switch 50. An arm 380 projected transversely from one end of the travelling plate 38 is adapted to contact with a second limit switch 52 for confining a horizontally moving zone of the travelling plate 38.

With respect to the injection machine 1 and the mold-clamping machine 2

The injection machine 1 having the apparatus 3 for taking out an injection-molded product fixed thereto is provided with a cylinder 16 having a screw (not shown) accommodated therein. A female mold 26 of an injection mold 24 is secured to the injection device 15 at the forward end of the cylinder 16.

A male mold 25 opposed to the female mold 26 to compose an injection mold 24 is fixed to a movable platen 22 adapted to travel as guided by tie bars 27, 27.

In the neighborhood of the mold-clamping machine 2 are arranged a stage 11 for stacking up a number of the product 10 thereon and an operating device 13. The operating device 13 stores data required for injection molding and for the action of the apparatus 3 for taking out an injection-molded product and provides instructions for the operation or stoppage of the machine.

With respect to a control device

Figure 2:
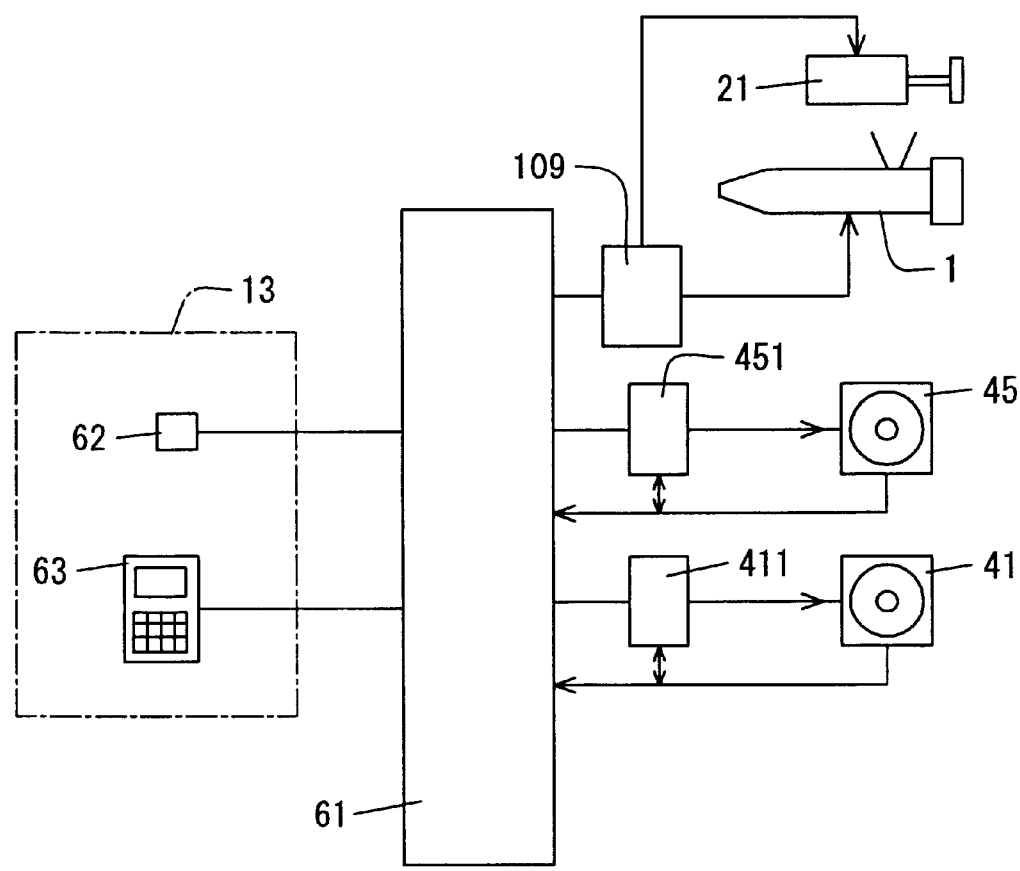
FIG. 2 is a schematic diagram showing an electric circuit or parts of the injection molding machine of FIG. 1.

FIG. 2 is a schematic diagram showing a control circuit of the injection molding machine shown in FIG. 1.

Connected to an input member of a control device 61 having a built-in microcomputer are an operation switch 62 and an operating device 13 having a length-determining device 63 for determining the length of the final linear zone L in the locus C for the movement of the product holder 42 (an equivalent of the above-mentioned means for determining the length of the final linear zone) in replacement of the injection mold. Also connected to the control device 61 is a molding machine-controlling device 109 for controlling the action of the mold-clamping cylinder 21 in the injection machine 1 and the mold-clamping machine 2. Servo controlling devices 411, 451 comprising a servo driver and a servo controller are connected to the clamping direction servomotor 41 and the ingress direction servomotor 45. Monitored by the control device 61 is a signal for indicating the rotation amount (encoder output) of the servomotors 41 and 45 which is output from the servo controlling devices 411, 451.

With respect to control actions

Figure 3:
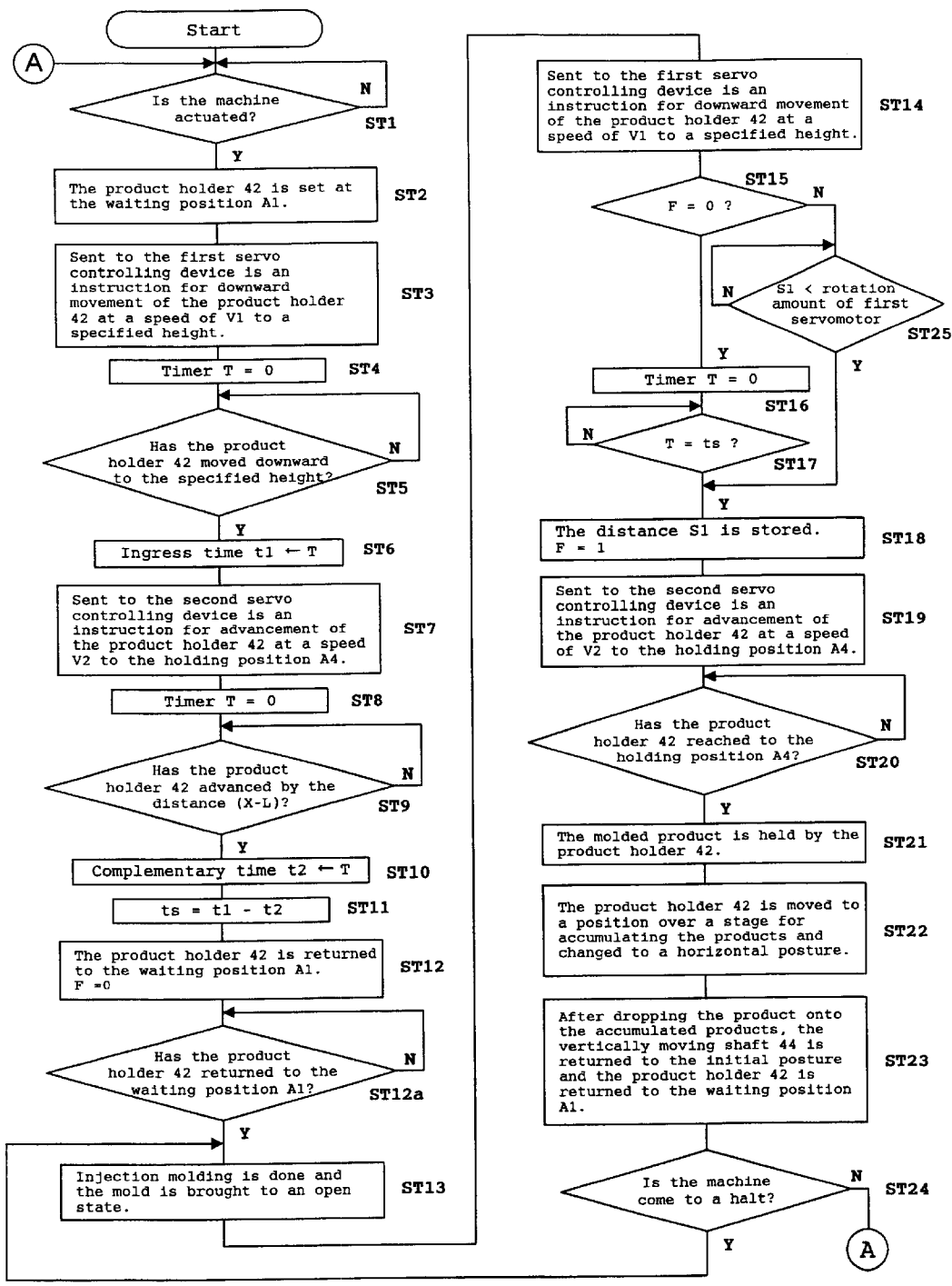
FIG. 3 is a flow chart showing a control program housed in a control device 61.
Figure 4:
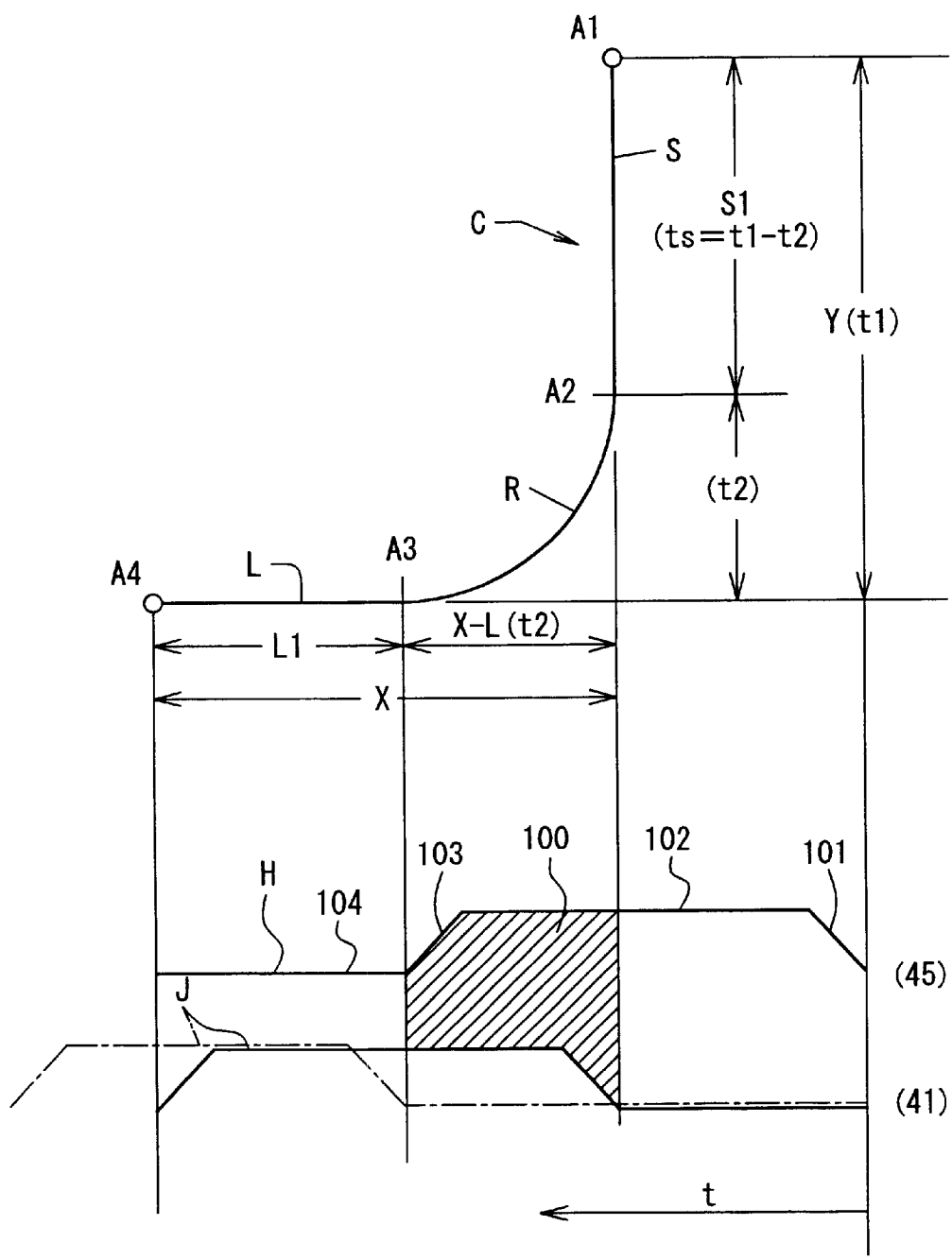
FIG. 4 is a view schematically showing a locus for the movement of a product holder 42.
Figure 5:
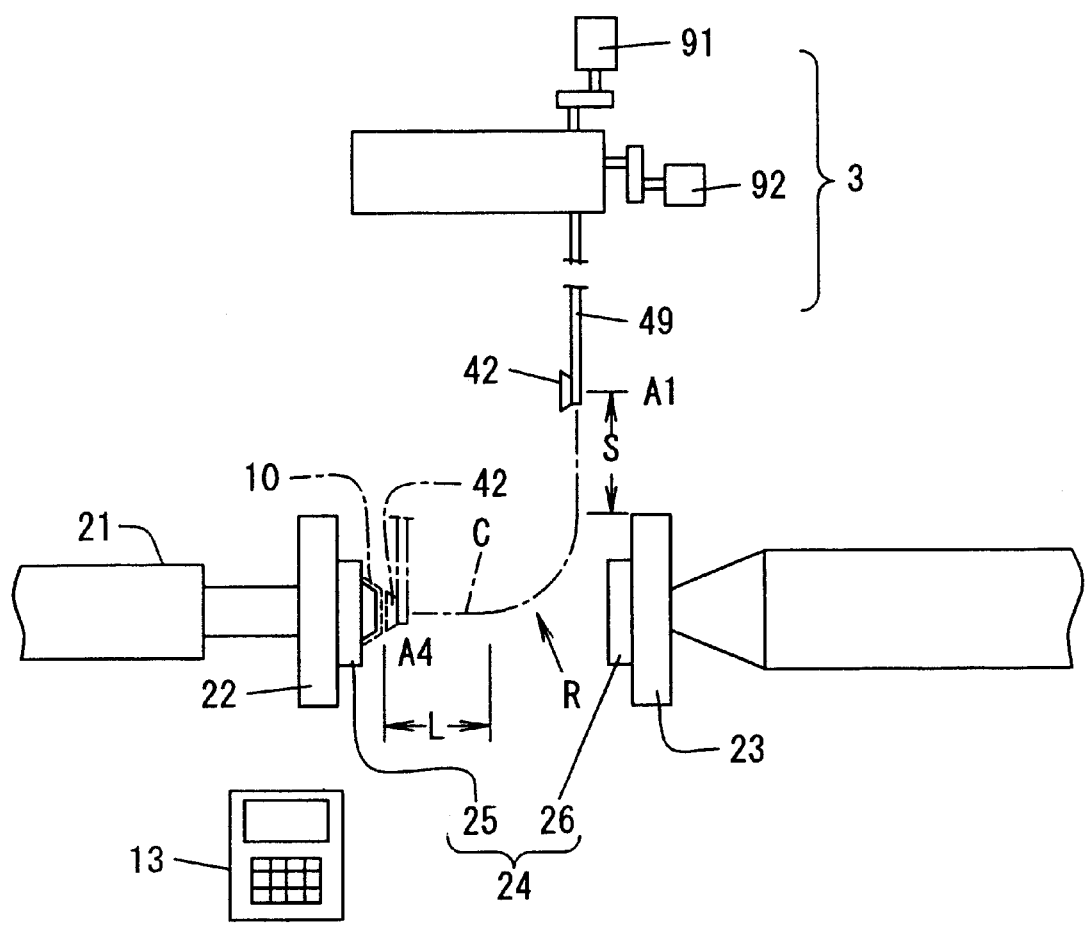
FIG. 5 is a view of one conventional embodiment.

Control instructions for the information shown in FIG. 3 are stored in the control device 61. According to the control instructions, a control action is executed to actuate the initial length-determining means. The means is capable of automatically determining the length (linear distance S1) of the initial linear zone S in the locus C (L-shaped locus C as shown in FIG. 4) for the movement of the product holder 42. After completion of the initial length-determining action, the product holder 42 is reciprocatingly moved along the locus C consisting of the initial linear zone S, the ensuing curved zone R and the final linear zone L to repeatedly take out the product 10 from the mold 24.

FIG. 4 shows, below the curve of the locus C for the movement of the product holder 42, a time chart indicating the timing of action by the ingress direction servomotor 45 and the clamping direction servomotor 41 (the time t is increased from the right to the left in FIG. 4. The upper and lower axes in FIG. 4 indicate the rotational speed of the servomotors 45, 41). The product holder 42 is moved along the curved zone R because of its horizontal but downward movement in a scope 100 (diagonally shaded scope in FIG. 4) wherein the servomotors 45, 41 are synchronously operated.

Next, the action of the injection molding machine according to the illustrated embodiment will be described with reference to FIGS. 3 and 4. The operator sets a length L1 of the last linear zone L by a length-determining device 63 in the operating device 13 before the operation of the injection molding machine.

The injection molding machine is actuated by an operation switch 62 while being monitored at a step ST1. Then the initial length-determining action is conducted to automatically determine the linear distance S1 of the initial linear zone S in FIG. 4. In the course of the initial length-determining action, the ingress direction servomotor 45 is rotated until the product holder 42 reaches a point on a linear line between the male and female molds 25, 26 in an open state and then upon rest of the servomotor 45, the clamping direction servomotor 41 is rotated until the product holder 42 reaches the holding position A4 at which the product holder 42 is brought into contact with or into the neighborhood of the product 10 in the mold. During the initial length-determining action, the product holder 42 is moved along the locus in the shape of L with a corner having a right angle.

With respect to the initial length-determining action.

The mold is kept open during the initial length-determining action.

The product holder 42 is first moved to the waiting position A1 indicated in FIG. 4 at a step ST2 in the course of the initial length-determining action. The vertically moving shaft 44 is elevated by the ingress direction servomotor 45 until the first limit switch 50 gives an ON signal while the travelling plate 38 is moved toward the side of the second limit switch 52 until the arm 380 comes into contact with the second limit switch 52 on which the control of the servomotors 45, 41 is based. Then the servomotors 45, 41 are rotated in the specified amount to move the product holder 42 to the waiting position A1.

Subsequently a signal is sent to the servo controlling device 451, namely the signal for rotating the ingress direction servomotor 45 at a specified speed until the product holder 42 reaches a point on a linear line between the male and female molds 25, 26 in an open state (the product holder 42 is moved at a predetermined speed of V1). Then a timer T (timer of ingress time) housed in the control device 61 is reset at a step ST4. When the above-mentioned signal is sent to the servo controlling device 451, the ingress direction servomotor 45 is controlled by the servo controlling device 451 to commence the change of speed with time as shown in a pattern H of FIG. 4. That is, the ingress direction servomotor 45 is rotated at an increased speed at an accelerating zone 101 and, after transfer to a constant speed zone 102, commences a constant rotation.

Then, a step ST5 is performed to monitor whether the product holder 42 is moved to a point on a linear line between the male and female molds 25, 26 in an open state (it is moved by the distance Y). The monitoring is conducted to monitor the encoder output of the ingress direction servomotor 45 which is output from the servo driver in the servo controlling device 451.

When the product holder 42 reaches a point on the linear line (the servomotor 45 is stopped at this point), the time measured by the built-in timer T is stored as an ingress time t1 at a step ST6. This means the completion of the action for determining the ingress time t1 (the step of determining the ingress time) required for the linear movement of the product holder 42 to a point on a linear line between the male and female molds 25, 26 in an open state.

Next, a step ST7 is executed for sending to the servo controlling device 411 a signal for rotating the clamping direction servomotor 41 at a specified speed until the product holder 42 is moved to the holding position A4 in the vicinity of the male mold 25 of the injection mold 24 in an open state (the product holder 42 is moved in a speed of V2). Thereafter, at a step ST8, the built-in timer T of the control device 61 (a timer for measuring the complementary time) is reset. On sending the signal to the servo controlling device 411, the clamping direction servomotor 41 is controlled by the servo controlling device 411 to commence a change of speed with time as shown in a pattern J indicated by an imaginary line in FIG. 4.

There is monitored the movement of the product holder 42 toward the side of the holding position A4 by the complementary length (X–L1) obtained by subtracting the length L1 of the final linear zone L set by the length-determining device 63 from the length X in the clamping direction between the waiting position A1 and the holding position L4 (step ST9). The monitoring is performed to monitor the encoder output of the clamping direction servomotor 41 which is output from the servo driver in the servo controlling device 411. According to the illustrated embodiment, the function member in the control device 61 for calculating the complementary length (X–L1) corresponds to the means for calculating the complementary length and the step of determining the complementary length.

Thereafter, the time measured by the built-in timer T (which is reset in the step ST8) for measuring the complementary time is stored as the complementary time t2 at a step ST10. Namely the step of determining the complementary time t2 is carried out. Then at a step ST11, the complementary time t2 is subtracted from the ingress time t1 (the subtraction step is equivalent to the step and means for determining a starting time of curved movement). The value obtained by the subtraction is equal to the time required from the start of the movement of the product holder 42 until it reaches the curved zone R, namely the starting time of curved movement ts. The complementary time t2 is a time required for the movement of the product holder 42 in the clamping direction from the starting point of movement by the length (X–L1) which is equal to a difference between the length X (from the waiting position A1 to the holding position A4 in the clamping direction) and the length L1 of the final linear zone L. That is to say, when the product holder 42 is moved earlier by the complementary time t2 than the product holder 42 reaches a point on a linear line between the male and female molds 25, 26 in an open state, the product holder 42 is advanced by the distance (X–L1) toward the clamping direction. According to the illustrated embodiment, the function member in the control device 61 for conducting the step ST11 corresponds; to the subtracting means for calculating the starting time of curved movement (the time for the product holder 42 to move over the initial linear zone S).

Next, at steps ST12 and ST12a, the product holder 42 is returned to the waiting position A1 and a flag F is brought to zero (the flag F being useful to confirm whether a first injection molding action is being performed after completion of the initial length-determining action), whereby the initial length-determining action is completed.

With respect to the injection molding action Upon completion of the initial length-determining action, injection molding operation is commenced.

At a step ST13, the injection machine 1 is put into operation to mold a resin in the mold 24 and then a mold-clamping cylinder 21 is retracted to bring the mold 24 to an open state (the state shown in FIG. 1).

Next, a step ST14 is practiced for sending to the servo controlling device 451 a signal for rotating the ingress direction servomotor 45 at a specified speed until the product holder 42 reaches a point on a linear line between the male and female molds 25, 26 in an open state (the product holder 42 is moved at a predetermined speed of V1). Then at a step ST15, the index of the flag F is checked to find whether the index of the flag F is zero and a first injection molding action is being done after completion of the initial length-determining action. At a step ST16, a built-in timer T is reset. At a step ST17, monitoring is conducted to see if the measured time of timer T agrees to the starting time of curved movement ts. In the case of agreement, the linear distance S1 which the product holder 42 has covered to reach the starting position A2 of curved movement is detected from the encoder output of the servomotor 45 delivered by the servo controlling device 451, and the information is stored at a step ST18. According to the above-mentioned embodiment, the function member in the control device 61 for determining the linear distance S1 from the encoder output of the servomotor 45 corresponds to the means for determining the initial rotation amount. At a step ST18, the index of the flag F is changed to 1. Then a step ST19 is practiced for sending to the servo controlling device 411 a signal for rotating the clamping direction servomotor 41 at a specified speed until the product holder 42 is moved to the holding position A4 in the vicinity of the male mold 25 of the injection mold 24 in an open state (the product holder 42 is moved at a speed of V2). Then, at this point, the ingress direction servomotor 45 which is still running is synchronously operated with the clamping direction servomotor 41 (the patterns H and J of FIG. 4 in which the two servomotors are operated in the overlapping scope), whereby the product holder 42 is moved along the curved zone R of the locus C. When the servomotor 45 comes to a halt after passage through a speed-reducing zone 103 of the pattern H in FIG. 4, the product holder 42 arrives at a terminal point A3 of curved movement. Thereafter, at a step ST20, the product holder 42 reaching the holding position A4 is monitored (monitoring the encoder output of the servomotor 41 delivered by the servo controlling device 411). After detecting the arrival of the product holder 42 at the holding position A4, the molded product 10 is held by absorption, more specifically using a vacuum device (not shown) at a step 21. Then, the ingress direction servomotor 45 is synchronously operated with the clamping direction servomotor 41, while a servomotor (not shown) in a box casing 35 disposed at one end of the horizontal arm 37 is rotated to move the horizontal arm 37 as a whole lengthwise of the horizontal arm member 33, whereby the product holder 42 is moved to a position above the stage 11. Subsequently, the pivotable arm 400 in this state is bent at a right angle to the vertically moving shaft 44 as indicated by an imaginary line in FIG. 1 and a sucking force of the product holder 42 exerted for absorption of the product 10 is released, so that a new molded article is dropped onto the other molded articles 10 stacked up on the stage 11.

Next, at a step ST23, the pivotable arm 400 is returned to an upright posture, and the clamping direction servomotor 41 and the ingress direction servomotor 45 are rotated until the product holder 42 is returned to the waiting position A1. At a step ST24, it is checked whether the control action is actuated for the stoppage of operation. In the case of continuous operation, the control action is returned to the step ST13 and a signal is sent for the instruction to operate the injection machine 1 and the mold-clamping machine 2. Then a new molded article is injection-molded, and the molded article 10 is taken out by the apparatus 3 for taking out a molded product and is placed on the stage 11 for accumulation. In this case, since the flag F did not indicate zero at the step ST15, the operation is recognized as a second or subsequent injection molding operation ensuing after completion of the initial length-determining action. Thereafter it is determined from the rotation amount of the servomotor 41 whether the product holder 42 has reached the starting position A2 of curved movement (whether the distance of movement is shorter than the distance S1) at a step ST25. At the step ST19 and subsequent steps, control is performed for the movement of the product holder 42 along the curved zone R on reaching the starting position A2 of curved movement.

The above-mentioned embodiment may be provided with a function of moving the product holder 42 over a horizontal line at a right angle to a linear line between the male and female molds 25, 26 by the ingress direction servomotor 45 unlike the function of moving the product holder 42 upward and downward by the servomotor 45 as already provided in the embodiment described hereinbefore. A further embodiment is possible wherein the product holder 42 is made to approach the linear line from an obliquely upward position.

What is claimed:

1. A method of controlling an apparatus for taking out an injection-molded product, the apparatus being capable of taking out a injection-molded product (10) from a mold in an open state while being held by a product holder (42) and releasing it at a releasing position, the apparatus comprising: clamping direction driving means for moving a product holder (42) in a clamping direction; and ingress direction driving means for moving the product holder (42) in a direction at a right angle to the clamping direction such that the clamping direction driving means is operated during the operation of the ingress direction driving means and after stoppage thereof, whereby the product holder (42) is moved along a locus (C) starting from a waiting position (A1) via an initial linear zone (S), a curve zone (R) and a final linear zone (L) to a holding position (A4) for holding the product (10), the method comprising the steps of: determining a complementary time required for the movement of the product holder (42) toward a clamping direction from a starting position of movement in the clamping direction by a distance equal to a difference between a length from the waiting position (A1) to the holding position (A4) in the clamping direction and the length of the final linear zone (L); subtracting the complementary time from a ingress time required for the movement of the product holder (42) from the waiting position (A1) to a point on a straight line between the male and female molds in an open state; and adopting, as the length of the initial linear zone (S), a linear distance along which the product holder (42) moves from the waiting position (A1) toward a point on a linear line until the product holder (42) reaches the curved zone (R) for the same period of time as given by the subtraction.

2. A method of controlling an apparatus for taking out an injection-molded product, the apparatus being capable of taking out a injection-molded product (10) from a mold in an open state while being held by a product holder (42) and releasing it at a releasing position, the apparatus comprising: clamping direction driving means for moving a product holder (42) in a clamping direction; and ingress direction driving means for moving the product holder (42) in a direction at a right angle to the clamping direction such that the clamping direction driving means is operated during the operation of the ingress direction driving means and after stoppage thereof, whereby the product holder (42) is moved along a locus (C) starting from a waiting position (A1) via an initial linear zone (S), a curve zone (R) and a final linear zone (L) to a holding position (A4) for holding the product (10), the method comprising the steps of: determining a complementary length by subtracting the length of a specified final linear zone (L) from the length in a clamping direction between a waiting position (A1) and a holding position (A4); determining an ingress time for a product holder (42) to move from a waiting position (A1) to a point on a linear line between the male and female molds in an open state; determining a complementary time for the product holder (42) to move in a clamping direction by the complementary length from a starting point of movement in the clamping direction; determining a time for the product holder (42) to commence a curved movement by subtracting the complementary time from the ingress time; and measuring a linear length for the product holder (42) to move from the waiting position (A1) toward a point on a linear line until the determined starting time of curved movement, wherein in taking out the product (10), the product holder (42) is moved from the waiting position (A1) by the linear distance and then is moved in the clamping direction.

3. An apparatus for taking out an injection-molded product, the apparatus being capable of taking out a injection-molded product (10) from a mold in an open state while being held by a product holder (42) and releasing it at a releasing position, the apparatus comprising: clamping direction driving means for moving a product holder (42) in a clamping direction; and ingress direction driving means for moving the product holder (42) in a direction at a right angle to the clamping direction such that the clamping direction driving means is operated during the operation of the ingress direction driving means and after stoppage thereof, whereby the product holder (42) is moved along a locus (C) starting from a waiting position (A1) via an initial linear zone (S), a curve zone (R) and a final linear zone (L) to a holding position (A4) for holding the product (10), the apparatus comprising: means for determining the length of a final linear zone (L); means for calculating a complementary length by subtracting the determined length of the final linear zone (L) from the length in a clamping direction between a waiting position (A1) and a holding position (A4); means for determining a starting time of curved movement by subtracting a complementary time from an ingress time required for an ingress direction servomotor to rotate at a predetermined speed until the product holder (42) starting from the waiting position (A1) reaches a point on a linear line between a male mold and a female mold in an open state, the complementary time being one required for the clamping direction servomotor to rotate at a predetermined speed until the product holder (42) moves in a clamping direction from a starting point of movement in the clamping direction by the complementary length; and means for determining an initial rotation amount of the ingress direction servomotor as measured from the waiting position of operation until the determined starting time of curved movement, when the ingress direction servomotor has rotated in the rotation amount determined by the means for determining the initial rotation amount of the ingress direction servomotor, the clamping direction servomotor is actuated.

4. The apparatus for taking out an injection-molded product according to claim 3, wherein the means for determining the starting time of curved movement comprises a timer of ingress time for measuring a time for the ingress direction servomotor to rotate at a specific speed until the product holder (42) moves by an ingress length between a waiting position (A1) and a point on a straight line between male and female molds in an open state; a timer of complementary time for measuring a time for the clamping direction servomotor to rotate at a specified speed until the product holder (42) moves by the complementary length; and means for determining a starting time of curved movement by subtracting the complementary time measured by the timer of complementary time from the operation time of the ingress direction servomotor as measured by the timer of ingress time.

* * * * *